J. HOGARTH.
MILLING ATTACHMENT FOR LATHES.
APPLICATION FILED JAN. 9, 1913.

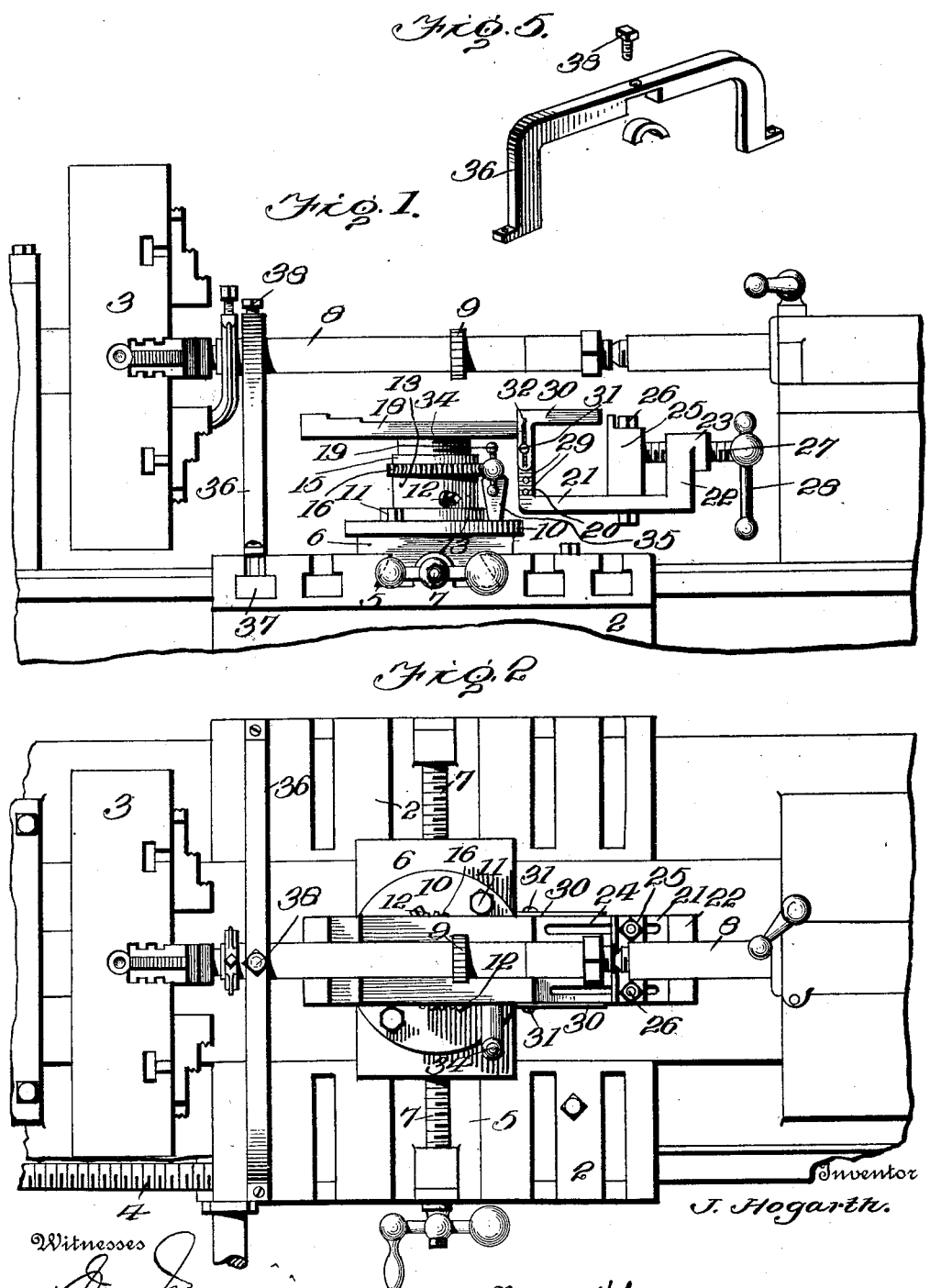

1,126,763.

Patented Feb. 2, 1915.
2 SHEETS—SHEET 2.

Inventor
J. Hogarth.

UNITED STATES PATENT OFFICE.

JAMES HOGARTH, OF DEADWOOD, SOUTH DAKOTA.

MILLING ATTACHMENT FOR LATHES.

1,126,763. Specification of Letters Patent. Patented Feb. 2, 1915.

Application filed January 9, 1913. Serial No. 741,036.

*To all whom it may concern:*

Be it known that I, JAMES HOGARTH, citizen of the United States, residing at Deadwood, in the county of Lawrence and State of South Dakota, have invented certain new and useful Improvements in Milling Attachments for Lathes, of which the following is a specification.

My invention relates to milling machinery and particularly to cutting mechanism designed for the purpose of milling, key-seating, slotting and facing up small castings or like articles.

The primary object of my invention is the provision of a lathe attachment whereby milling, key-seating, surfacing, etc., can be accomplished with an ordinary lathe.

A further object is the provision in an attachment of this character of a work support adapted to be attached to the tool carriage of an ordinary lathe and angularly adjustable relative to the milling cutter.

A further object in this connection is the provision of an attachment as before described which is both vertically and angularly adjustable.

Still another object is the provision of means for gripping work to be milled or surfaced and holding it in proper adjustment to a shaft carrying a milling cutter or like tool, and to provide for this purpose a vise having an adjustable jaw, this vise being angularly adjustable in a horizontal plane and vertically adjustable so that the work to be milled may be brought into any proper relation with the milling tool.

Still another object is the provision of a gage upon one of the jaws of the vise whereby tapered keys may be cut or tapering keyways cut.

Other objects will appear in the course of the following description.

Figure 3:
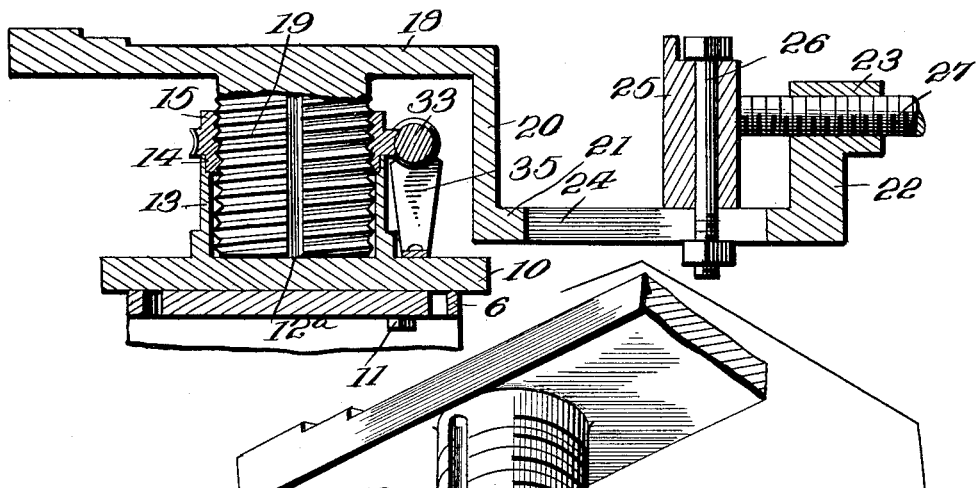
Figure 4:
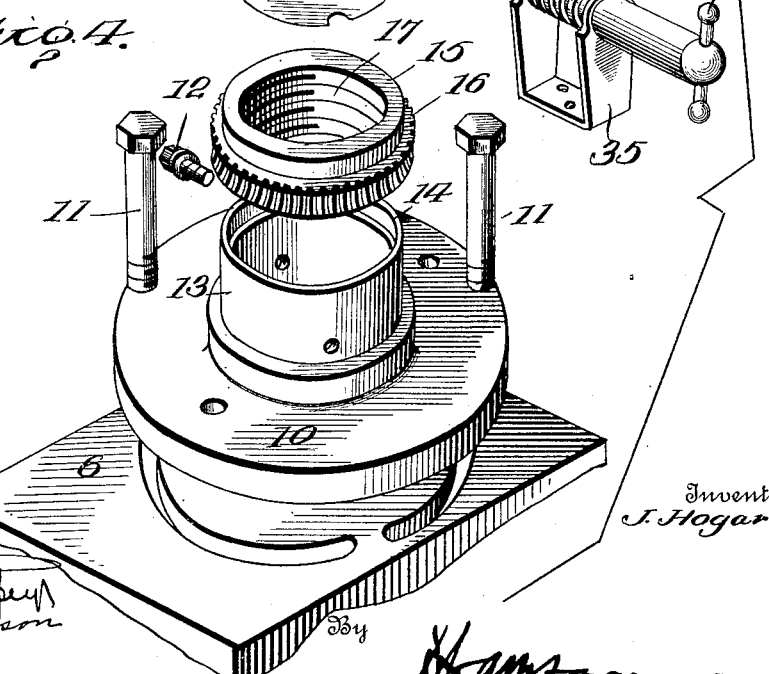

My invention is illustrated in the accompanying drawings wherein:

Figure 1 is a side elevation of a portion of a lathe arranged for milling and with my attachment applied thereto. Fig. 2 is a plan view of the structure shown in Fig. 1. Fig. 3 is an enlarged longitudinal sectional view through the base of my attachment and the supporting table. Fig. 4 is a perspective view showing a portion of the ordinary tool supporting slide of a lathe, the base of my attachment and the work supporting table, the several parts being separated from each other. Fig. 5 is a front elevation of the steady rest used for supporting the mandrel.

Corresponding and like parts are referred to in the following description and indicated in all the views of the accompanying drawings by the same reference characters.

Referring to these drawings, 2 designates the carriage of a lathe of any ordinary or suitable construction and 3 the chuck thereof. The carriage 2 is longitudinally slidable as usual along keyways and is shifted by means of a screw 4 in the usual or ordinary manner. Disposed upon the upper face of the carriage and slidable in the dovetail slot 5 is the usual tool support 6 which is shifted laterally by means of a screw 7. All these parts are of the usual construction and form no part of my invention.

As illustrated, the mandrel 8 is mounted in the chuck 3, and mounted upon this mandrel is a milling cutter 9. Preferably the milling cutter is held between centers on the lathe.

My attachment comprises a base 10 adapted to be mounted upon the sliding member 6 and held in position thereon by bolts 11 passing down through slots in the member 6. These slots in the member 6 are arcuate so that the base 10 may be rotated upon the slide 6 and the base angularly adjusted in a horizontal plane.

The base is formed with a central, upwardly projecting supporting ring 13 recessed or rabbeted at its upper edge on its inside face as at 14, and seating in this rabbet 14 is an adjusting member 15 formed with gear teeth 16 and internally screw threaded as at 17. Extending into opposite sides of the ring 13 are the set screws 12. It will be seen that the outwardly projecting gear teeth rest upon the upper edge of the annular ring 13. The work holder comprises a plate or table 18 provided with a downwardly projecting screw threaded barrel 19 adapted to fit the interior of the member 15, and formed at diametrically opposite portions with vertical grooves 12$^a$ within which the ends of the set screws 12 engage. The set screws 12 thus prevent any rotation of the barrel and of the table therefor relative to the base, but of course the base and table will rotate together to any desired angularly adjusted position.

The table or plate 18 is downwardly bent at one end as at 20 and then extended laterally to the downwardly bent portion as at 21. The extremity of this portion 21 is upwardly extended as at 22 forming a flange provided with a screw bearing 23. The flat portion 21 is longitudinally slotted as at 24 and mounted upon the flat portion 21 is a sliding jaw 25 having bolts 26 which pass down through the slots 24 and clamp the jaw in any adjusted position. A screw 27 passes through the bearing 23 and is provided with the usual handle 28 whereby it may be rotated. It will be seen that this jaw 25 coacts with the portion 20 which forms a fixed jaw and that it may be adjusted to any desired position and will securely clamp the piece of work to be milled between the sliding jaw 25 and the portion 20 which constitutes the fixed jaw. The member composed of the parts 18, 20, 21 and 22 and the sliding jaw 25 constitutes therefore a work holder which may be raised or lowered and which may be angularly adjusted to any desired position so that the work may be held in any desired relation to the milling cutter 9.

The face of the fixed jaw 20 is provided with graduations 29. Gages 30 are attached to the faces of the jaw 20 by means of a thumb nut 31 so that the gage may be raised or lowered in accordance with these graduations. Each face of jaw 20 is provided with a plurality of screw threaded perforations for engagement by the respective thumb nuts. A gage is placed on each side of the vise formed by the jaws 20 and 25 so that keys for instance may be made tapered as well as square. By raising one side 1/64 of an inch, the key made in this vise can be cut 1/64 of an inch smaller on one end than the other, or a tapering keyway may be made on a shaft by the same method. As illustrated, each gage is right angular and formed with a longitudinal slot 32 through which the thumb nut passes.

For the purpose of angularly adjusting the work support, I mount upon the base the adjusting screw 33 which is provided with a handle 34 and which is mounted in a yoke 35 bolted or otherwise attached to the base 10. The screw threads on this screw engage with the gear teeth of the ring 15. It will be obvious that by rotating the screw in one direction or the other, the ring 15 will be rotated and that this will carry up or down the work support.

In order to hold the mandrel from vibrating while the cutter is in operation, I provide a steady rest for the mandrel designated 36. This rest is U-shaped in side elevation and is applied to the lathe carriage, the steady rest being provided on the ends of its legs with T-headed bolts which engage with the transverse slots 37. The middle of the steady rest is formed with a recess which loosely embraces a loose bearing which engages shaft 8 and passing through the cross bar of the rest is a screw 38 which may be brought down upon the bearing so as to tighten it upon the top of the mandrel and steady the same.

The operation of my invention is obvious from what has gone before. The work to be operated upon is clamped between the fixed and movable jaw of the vise and it is obvious that by rotating the regulating screw 33, the work may be raised or lowered and that by setting the table to any angular degree upon the carriage and clamping it by the bolt 11, the work may be held in any desired angular position relative to the cutter.

The lathe attachment above described is found in actual experience to stand as much strain as any other part of the lathe and will give an ordinary lathe a wide range of work in milling, key-seating or in any other kind of work that can be done on a milling machine. It works automatically with a lathe cross feed and cuts equally well either to right or left. The attachment is particularly designed for small blacksmith shops not equipped with tools suitable to repair automobiles such as milling machines and shapers but usually equipped with a lathe. By means of this attachment used with an ordinary lathe, small shops can turn out any part of an automobile as perfectly as though they had more expensive machinery.

What I claim is:

1. A milling attachment for lathes including a base adapted to be attached to a lathe carriage, said base being rotatably adjustable, a work support mounted upon said base, means for vertically adjusting the work support upon the base, said work support including a table extending radially from the axis of the base, the table being formed adjacent its extremity with relatively movable jaws, and means whereby the jaws may be relatively shifted.

2. A milling attachment for lathes including a base adapted to be attached to a lathe carriage and having an annular socket, a work support including a table having a hub extending into said socket, means mounted upon the table and engaging said hub whereby the table may be raised and lowered independently of the base, said table extending radially outward from the hub and being provided with relatively movable work engaging jaws.

3. A milling attachment for lathes comprising a base adapted to be attached to a lathe carriage for rotative adjustment in one plane, a work support having a hub operatively mounted upon the base and adjustable in a plane at right angles to the plane of movement of the base, said work support including a table extending radially from the hub and formed with fixed and movable work engaging jaws.

4. A milling attachment for lathes including a base, means adapted to engage the base with the tool supporting slide of a lathe carriage, said means permitting the rotative adjustment of the base, an internally screw threaded annulus rotatably mounted upon said base, means for rotating said annulus, and a work supporting table including an exteriorly screw threaded hub engaged by said annulus, means for preventing a rotation of said hub relative to the table, and work engaging jaws carried by said supporting table.

5. A milling attachment for lathes including a base having bolts adapted to be engaged with the tool supporting slide of a lathe carriage, an annular gear wheel rotatably mounted upon said base and internally screw threaded, means for rotating said gear wheel, and a work supporting table including an exteriorly screw threaded hub engaging said annular gear wheel, and jaws carried by said work supporting table.

6. A milling attachment for lathes including a base adapted to be attached to the tool supporting slide of a lathe carriage for rotative engagement thereon, an annular gear wheel rotatably mounted upon said base and internally screw threaded, a screw mounted upon said base and engaging the gear wheel to rotate the same, and a work supporting table having a screw threaded hub engaged by said gear wheel and having a fixed and a movable jaw.

7. The combination with a shaft and a cutter thereon, of a carriage movable parallel with the shaft, a slide mounted upon the carriage and movable transversely thereof, a base rotatably mounted upon the slide, an annular gear wheel rotatably mounted upon the base and internally screw threaded, a worm screw mounted upon said base and engaging the gear wheel, and a work supporting table having a screw threaded hub engaging the screw threads of the gear wheel, a fixed jaw carried by said table, a jaw shiftable toward and from the fixed jaw, and means for adjusting and holding said last named jaw.

8. The combination with a shaft, a cutter thereon, a carriage movable longitudinally of the shaft and a slide mounted upon said carriage movable at right angles to the shaft, of a base resting upon the slide and held thereto for rotative adjustment, a work supporting table mounted upon said base for vertical adjustment, said table being downwardly bent at one end, then extended parallel to the carriage and then bent upwardly, the downwardly extending portion of the table forming a fixed jaw, a shiftable jaw mounted upon said table and movable toward and from the face of the fixed jaw, and means for shifting said movable jaw.

9. The combination with a shaft, a cutter thereon, a carriage movable longitudinally of the shaft and a slide mounted upon said carriage movable at right angles to the shaft, of a base resting upon the slide and held thereto for rotative adjustment, a work supporting table mounted upon said base for vertical adjustment, said table being extended radially from the vertical axis of the base and being downwardly bent to form a fixed jaw, then extending longitudinally, then upwardly bent, said longitudinally extending portion of the table being slotted, a movable jaw mounted on said slotted portion of the table, an adjusting screw passing through the upwardly bent extremity of the table and engaging said movable jaw, and means for holding the movable jaw set in any adjusted position.

10. In a lathe, the combination with a head stock, a shaft mounted therein and a carriage extending beneath the shaft and movable longitudinally parallel to the shaft, said carriage being formed with transversely extending T-shaped grooves, of a steady rest for said shaft comprising a bowed member having T-shaped bolts at its ends engaging said T-shaped grooves, the middle portion of said member being cut away to partially embrace and arch over the shaft, and a screw passing through the middle of the bowed member and engageable with the shaft.

11. A milling attachment for lathes including a base adapted to be attached to a lathe carriage, a work support vertically adjustable upon said base, said support comprising a table downwardly bent at one end, then extended parallel to said base, the downwardly extending portion of the table being formed with graduations and forming a fixed jaw, a jaw movable toward and from the fixed jaw, and a gage slidingly mounted upon the fixed jaw and coacting with said graduations.

12. A milling attachment for lathes including a base, means adapted to engage the base with the tool supporting slide of a lathe carriage, said means permitting a rotative adjustment of the base, a work supporting table having a downwardly projecting hub, an upwardly projecting member on the base with which said hub has telescopic engagement, and an interiorly screw threaded annulus having operative engagement with the hub and with the upwardly extending member on the base whereby the table may be raised or lowered upon a rotation of the annulus.

In testimony whereof I affix my signature in presence of two witnesses.

JAMES HOGARTH. [L. S.]

Witnesses:
 KING W. TRIMBLE,
 M. M. WHEELER.

Copies of this patent may be obtained for five cents each, by addressing the "Commissioner of Patents, Washington, D. C."